(12) United States Patent
Kettle et al.

(10) Patent No.: US 7,497,577 B2
(45) Date of Patent: *Mar. 3, 2009

(54) LIGHT MODULATOR ASSEMBLY

(75) Inventors: Wiatt Kettle, Corvallis, OR (US); James W. Ring, Blodgett, OR (US); Scott Lerner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 334 days.

This patent is subject to a terminal disclaimer.

(21) Appl. No.: 11/149,606

(22) Filed: Jun. 9, 2005

(65) Prior Publication Data

US 2006/0279707 A1    Dec. 14, 2006

(51) Int. Cl.
*G03B 21/14*  (2006.01)
*G03B 21/26*  (2006.01)
*G03B 21/28*  (2006.01)
*H04N 5/74*   (2006.01)
*G02F 1/1335* (2006.01)
*G02B 5/30*   (2006.01)
*G02B 27/28*  (2006.01)
*G02B 1/10*   (2006.01)
*G02B 27/14*  (2006.01)
*G02B 27/12*  (2006.01)

(52) U.S. Cl. .................. 353/31; 353/20; 353/33; 353/34; 353/37; 353/84; 348/750; 348/757; 348/758; 349/8; 349/9; 359/502; 359/580; 359/638; 359/640

(58) Field of Classification Search ............ 353/20, 353/31, 33, 34, 37, 81, 82, 84, 98, 99; 348/739, 348/742, 744, 750–752, 757–762, 766; 349/5, 349/7–9, 96, 97, 104–106; 359/496, 502, 359/589, 590, 629, 638–640, 834
See application file for complete search history.

(56) References Cited

U.S. PATENT DOCUMENTS

| | | | |
|---|---|---|---|
| 5,822,128 A | 10/1998 | Sekine | |
| 5,896,232 A | 4/1999 | Budd et al. | |
| 5,959,778 A | 9/1999 | Shimonura et al. | |
| 6,141,151 A | 10/2000 | Shimonura et al. | |
| 6,157,420 A * | 12/2000 | Nakanishi et al. | 349/9 |
| 6,347,014 B1 * | 2/2002 | Hayashi et al. | 359/634 |
| 6,456,012 B1 | 9/2002 | Kuroda | |
| 6,592,226 B1 | 7/2003 | Fujimori | |
| 7,038,739 B2 * | 5/2006 | Kuan et al. | 349/8 |
| 7,318,645 B2 * | 1/2008 | Kettle et al. | 353/20 |
| 2002/0080331 A1 * | 6/2002 | Na | 353/20 |
| 2003/0103193 A1 | 6/2003 | O'Donnell et al. | |
| 2003/0122780 A1 | 7/2003 | Hendriks et al. | |
| 2003/0142276 A1 | 7/2003 | English, Jr. et al. | |
| 2003/0231262 A1 | 12/2003 | Janssen | |
| 2004/0218390 A1 | 11/2004 | Holman et al. | |
| 2004/0246389 A1 | 12/2004 | Roth | |

* cited by examiner

*Primary Examiner*—Rochelle-Ann J Blackman (57) ABSTRACT

A projection assembly includes a dichroic beam splitter having first and second crossed dichroic surfaces, at least one interference type light modulator panel optically coupled to the dichroic beam splitter, and at least one filter at least partially between the light modulator panel and the dichroic beam splitter.

24 Claims, 6 Drawing Sheets

LIGHT MODULATOR ASSEMBLY

BACKGROUND

Display systems display an image or series of images on a display surface. In particular, each image is frequently made up of several sub-images. For example, some systems produce a red, a green, and a blue sub-image that are then selectively combined to form a single, full-color image.

Several display systems include a light source module that produces light. The light produced by the light source module is directed to a prism and polarizer(s). The polarizer and prism split the light into component colors. For example, a tri-color prism may split the light into red, green, and blue light rays. The light directed to each of the modulator panels is then modulated to form the sub-images, as introduced.

SUMMARY

A projection assembly includes a dichroic beam splitter having first and second crossed dichroic surfaces, at least one interference type light modulator panel optically coupled to the dichroic beam splitter, and at least one filter at least partially between the light modulator panel and the dichroic beam splitter.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A multi-panel light modulator assembly is provided herein for use with projection assemblies and display systems such as televisions, projectors, etc. According to several exemplary embodiments, the multi-panel light modulator assembly includes a dichroic beam splitter that is configured to split multi-component light into several components. These component beams are passed through a corresponding filter as the component beams are directed to a corresponding light modulator panel. According to several exemplary embodiments discussed below, the light modulator panels are interference based light modulator panels. Each light modulator panel modulates the component light to form a sub-image. The sub-images are then directed back through the dichroic beam splitter and directed to display optics.

Exemplary projection assemblies may be on-axis or off-axis type projection assemblies. The term on-axis shall be understood to refer broadly to an assembly in which the paths of un-modulated light and modulated light through a dichroic beam splitter are substantially similar. The term off-axis shall be understood to refer broadly to an assembly in which the paths of un-modulated light and modulated light through a dichroic beam splitter are different.

The use of filters with each light modulator panel may decrease the complexity and expense of the light modulator panel assembly. An exemplary display system will first be discussed, followed by an exemplary method of modulating light and an exemplary light modulator assembly.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
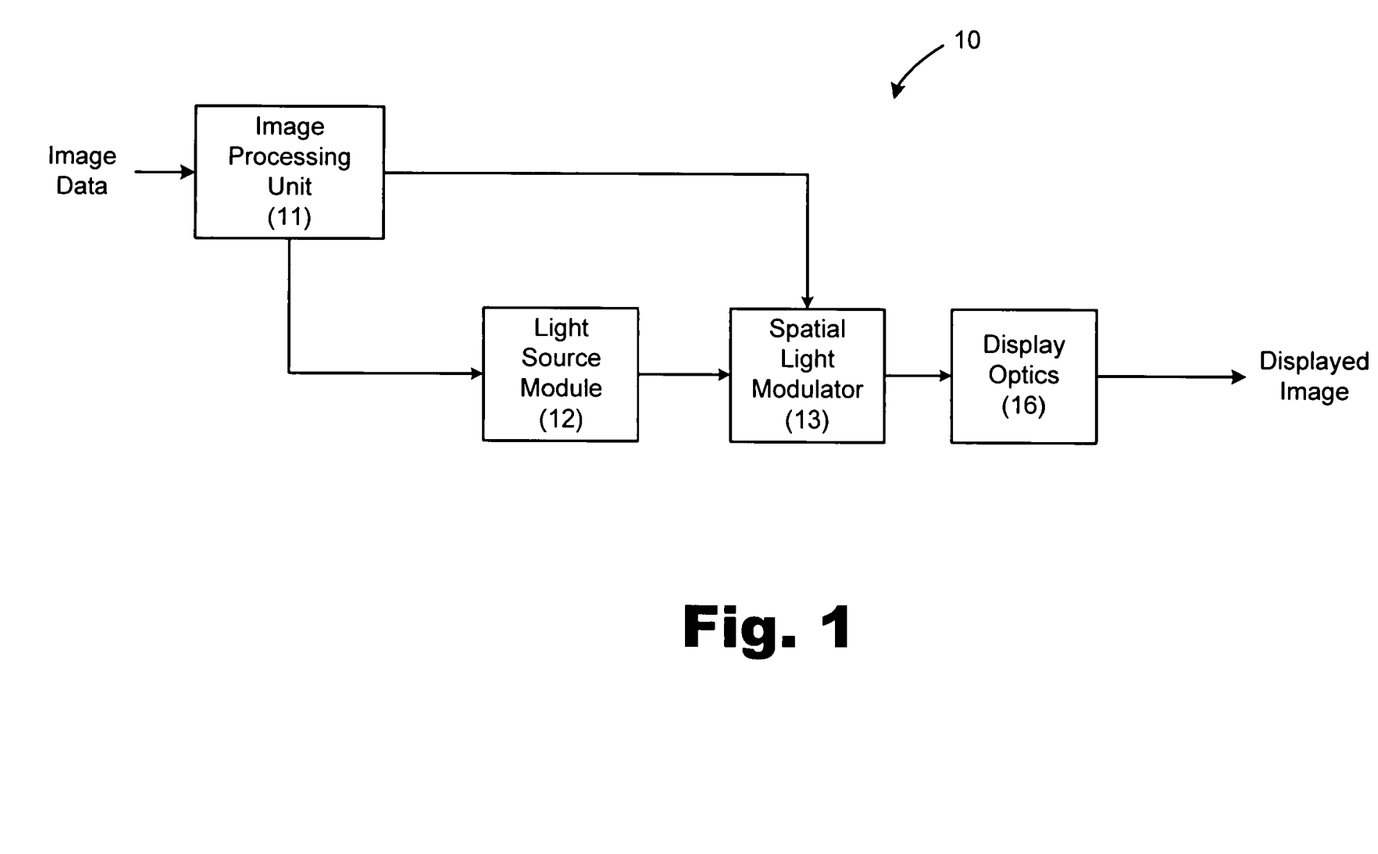
FIG. 1 illustrates a display system according to one exemplary embodiment.

FIG. 1 illustrates an exemplary display system (10). The components of FIG. 1 are exemplary only and may be modified or changed as best serves a particular application. As shown in FIG. 1, image data is input into an image processing unit (11). The image data defines an image that is to be displayed by the display system (10).

While one image is illustrated and described as being processed by the image processing unit (11), it will be understood by one skilled in the art that a plurality or series of images may be processed by the image processing unit (11). The image processing unit (11) performs various functions including controlling the illumination of a light source module (12) and controlling a spatial light modulator assembly (SLM assembly) (13).

The light source module (12). The light source module may produce multi-component or white light. The multi-component lamp is directed to the SLM assembly (13). The terms "SLM" and "modulator" will be used interchangeably herein to refer to a spatial light modulator.

For example, according to one exemplary embodiment, the SLM assembly (13) includes a dichroic beam splitter, such as a dichroic cube or cross, which splits the white light directed to the SLM assembly (13) from the light source module (12) into component beams. These component beams, which may include a red beam, a blue beam, and a green beam, are passed through a corresponding filter placed between the dichroic beam splitter and each of the light modulator panels. Each of the light modulator panels modulates the incident light and directs the modulated light back through the filters. The modulated light is then directed from the dichroic beam splitter to the display optics (16).

The display optics (16) may include any device configured to display or project an image. For example, the display optics (16) may be, but are not limited to, a lens configured to project and focus an image onto a viewing surface. The viewing surface may be, but is not limited to, a screen, television such as a rear projection type television, wall, liquid crystal display (LCD), or computer monitor. An exemplary method of modulating light in a spatial light modulator will now be discussed.

Light Modulator Assembly with Filters

Figure 2:
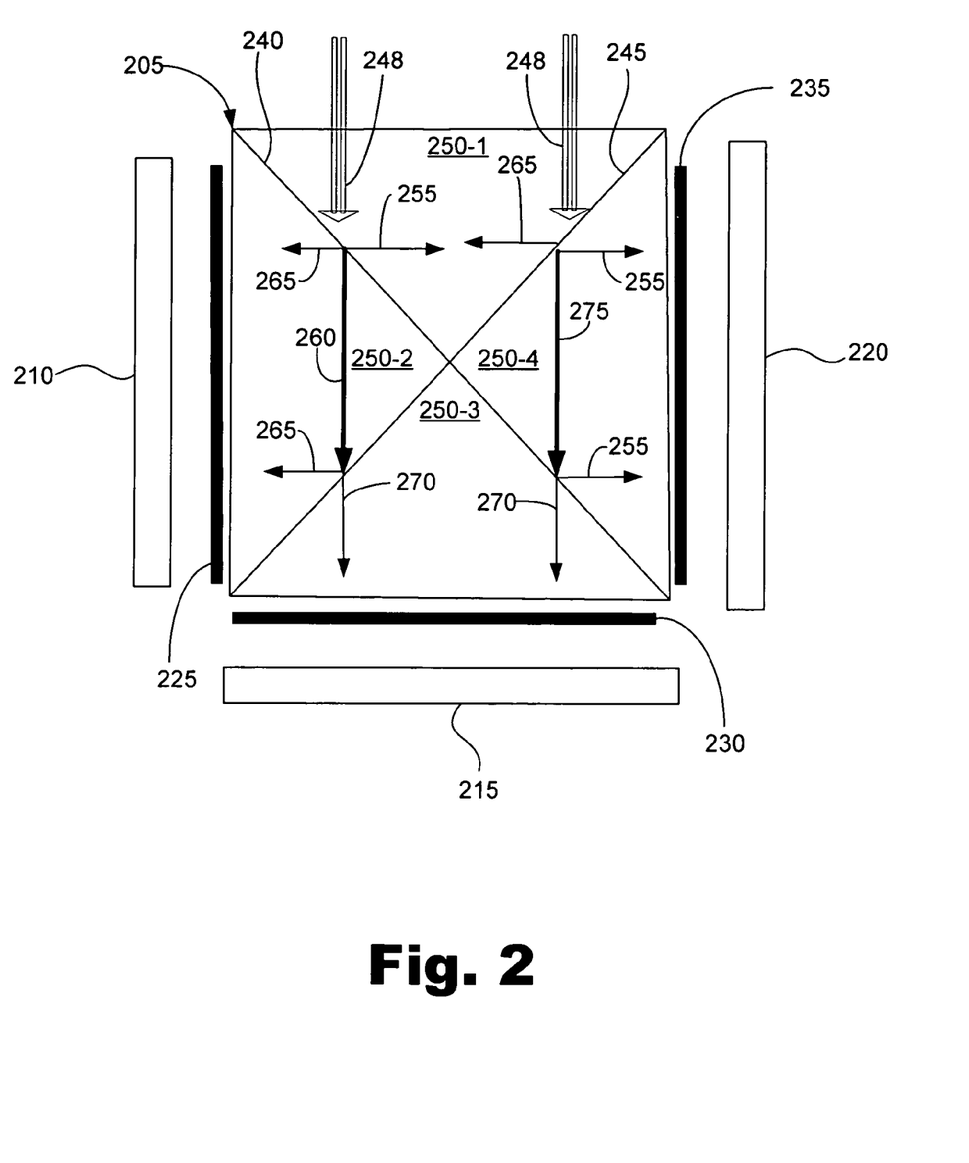
FIG. 2 illustrates a light modulator assembly that includes a dichroic beam splitter according to one exemplary embodiment.

FIG. 2 illustrates an exemplary light modulator assembly (200). The light modulator assembly (200) includes a dichroic beam splitter (205), and three modulator panels, which may include a blue modulator panel (210), a green modulator panel (215), and a red modulator panel (220). Three filters are placed between the dichroic beam splitter (205) and the modulator panels. The filters may include a blue filter (225), a green filter (230), and a red filter (235). The light modulator panels discussed herein are interference type light modulator panels. While a red, blue, green configuration is described, those of skill in the art will appreciate that other configurations are possible.

Accordingly, the present exemplary light modulator assembly (200) is a three-panel type light modulator assembly. As will be discussed in more detail below, the dichroic beam splitter (205) splits light into its component colors and directs each component color to an associated modulator.

The dichroic beam splitter (205) includes a first dichroic surface (240) and a second dichroic surface (245). In particular, according to the present exemplary embodiment, the first dichroic surface (240) and second dichroic surface (245) formed on first, second, third and fourth prisms (250-1, 250-2, 250-3, 250-4). The interfaces of the prisms define a cross.

The first dichroic surface (240), according to the first exemplary embodiment, is configured to transmit green and blue light and to reflect red light. In particular, the first dichroic surface (240) may include a dichroic layer formed on glass or other suitable transparent or semi-transparent material as is well known on the art.

The second dichroic surface (245) is configured to transmit red and green light and to reflect blue light. In particular, the second dichroic surface (245) may include a dichroic layer formed on glass or other suitable transparent or semi-transparent material.

White light (248) directed to the dichroic beam splitter (205) enters the first prism (250-1) where it is incident on the first and second dichroic surfaces (240, 245). That portion of white light (248) incident on the first dichroic surface (240) is split into two beams. The red component beam (255) is reflected away from the first dichroic surface (240) with a substantially similar angle of reflection, while a green/blue beam (260) is transmitted to the second prism (250-2).

The blue/green beam (260) is directed through the second prism until it is incident on the second dichroic surface (245). As introduced, the second dichroic surface (245) is configured to transmit green and red light and to reflect blue light. Consequently, the second dichroic surface (245) splits the blue/green beam (260) into a blue beam (265), which is reflected, and a green beam (270), which is passed into the third prism (250-3).

The reflected blue beam (265) is passed through the blue filter (225) and to the blue modulator panel (210), while the transmitted green beam (270) is passed through the green filter (230) and to the green modulator panel (215). The blue and green filters (225, 230) may reduce the amount of stray light directed to each modulator panel. Accordingly, the blue and green portions of white light (248) incident on the first dichroic surface (240) are split and directed to the blue and green modulator panels (210, 215) respectively.

The red portion (255) of white light (248) incident on the first dichroic surface (240) of the first prism (250-1) is reflected. In particular, the reflected red beam (255) is directed through the first prism (250-1) to the second dichroic surface (245). The second dichroic surface (245) transmits the red beam (255) and directs it through the red filter (235) and to the red modulator panel (220). The red filter (235) minimizes stray or non-red light that reaches the red modulator panel (220).

The second dichroic surface (245) is also configured to split white light (248) that is incident thereon in the first prism (250-1). In particular, when white light (248) is directed to the second dichroic surface (245) of the first prism (250-1), a red/green beam (275) is transmitted to the fourth prism (250-4) while a blue beam (265) is reflected.

The reflected blue beam (265) is directed across the first prism (250-1) to the first dichroic surface (240). The first dichroic surface (240) transmits the blue beam (265) through the second prism (250-2) to the blue modulator panel (210).

The red/green beam (275) from the first prism (250-1) is directed to the first dichroic surface (240) in the fourth prism (250-4). This red/green beam (275) is then split into two beams. One beam includes a reflected red beam (255), which is directed through the red filter (235) to the red modulator panel (220). The second beam includes a transmitted green beam (270), which is directed through the third prism (250-3) and the green filter (230) to the green modulator panel (215).

The light directed to red, green, and blue modulator panels (210, 215, 220) is then modulated to form individual sub-images. In particular, each of the modulator panels includes an array of individual light modulator devices or pixels. An exemplary light modulator device will now be discussed in more detail.

Light Modulator Device

Figure 3:
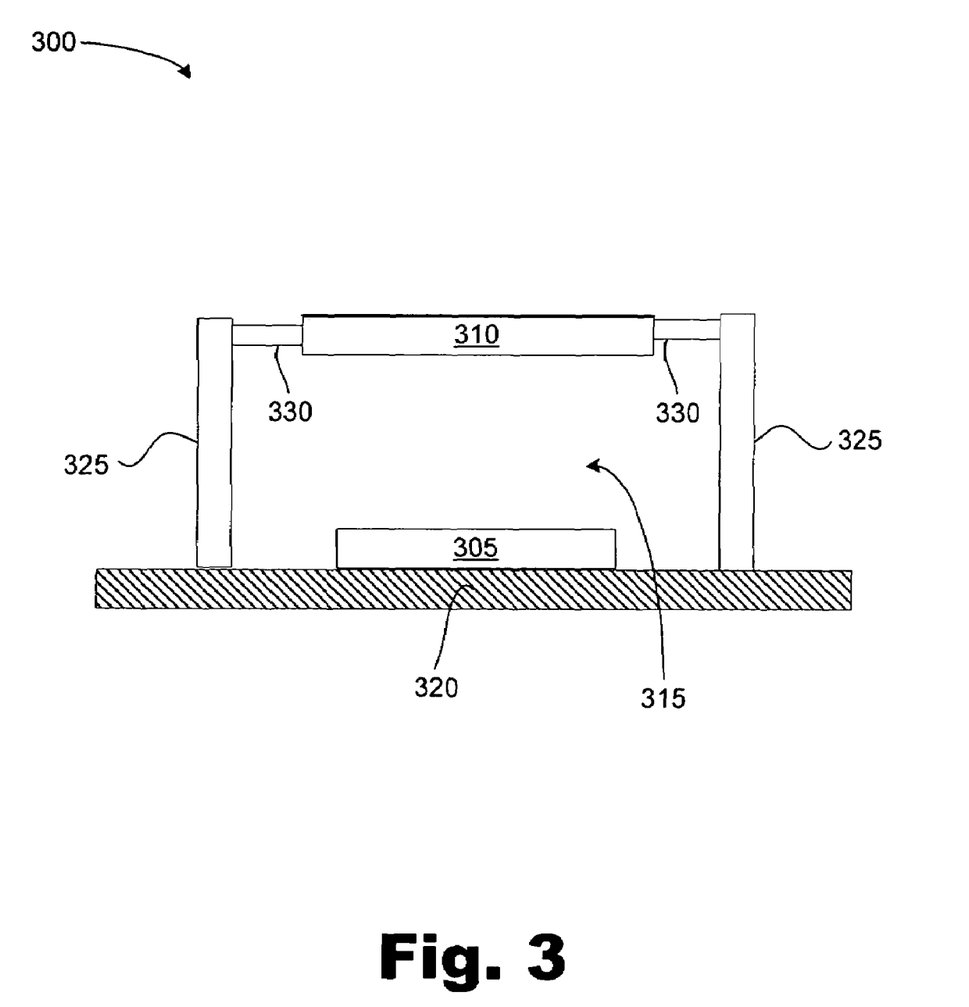
FIG. 3 illustrates a light modulator device according to one exemplary embodiment.

The light modulator device (300) includes a reflective plate (305) and a top plate (310) separated by a gap (315). As will be discussed in more detail below, the light modulator device (300) is configured to allow the top plate (310) to move and has a control mechanism to provide the movement, thereby modulating light that is incident on the light modulator device (300). The configuration of the light modulator device (300) will now be discussed in more detail.

The light modulator device (300) is supported by a substrate (320). Posts (325) are also supported by the substrate (320). Flexures (330) are coupled to the posts (325) and support the reflective plate (305) above the substrate (320).

The light modulator device (300) functions as an interference type light modulator, such as a Fabry-Perot light modulator. In particular, the light modulator device (300) may provide constructive interference, such as color filtering and/or destructive interference, such as black state interference. As a result, the top of the reflective plate (305) is treated with a highly reflective coating while a portion of the underside of the top plate (310) is treated with a partially reflective coating. A portion of a beam of light incident on the light modulator device (300) will pass through the top plate (310) and be partially reflected by the partially reflective coating on the underside of the top plate (310) while another portion of the beam of light will pass through the top plate (310) and the partially reflective coating and into the gap (315).

Once the light enters the gap (315), it is bounced between the partially reflective coating on the underside of the top plate (310) and the highly reflective coating on the reflective plate (305). Each time the light inside the gap (315) becomes incident on the partially reflective top plate (310), some portion of the light passes through the partially reflective coating and the top plate (310) and escapes the light modulator device (300). The wavelengths of the light that are thus able to pass through the top plate (310) depend at least in part on the size of the gap (315). Accordingly, varying the size of the gap (315) controls the characteristics of light that exits the light modulator device (300).

On-Axis Projection Assembly

Figure 4:
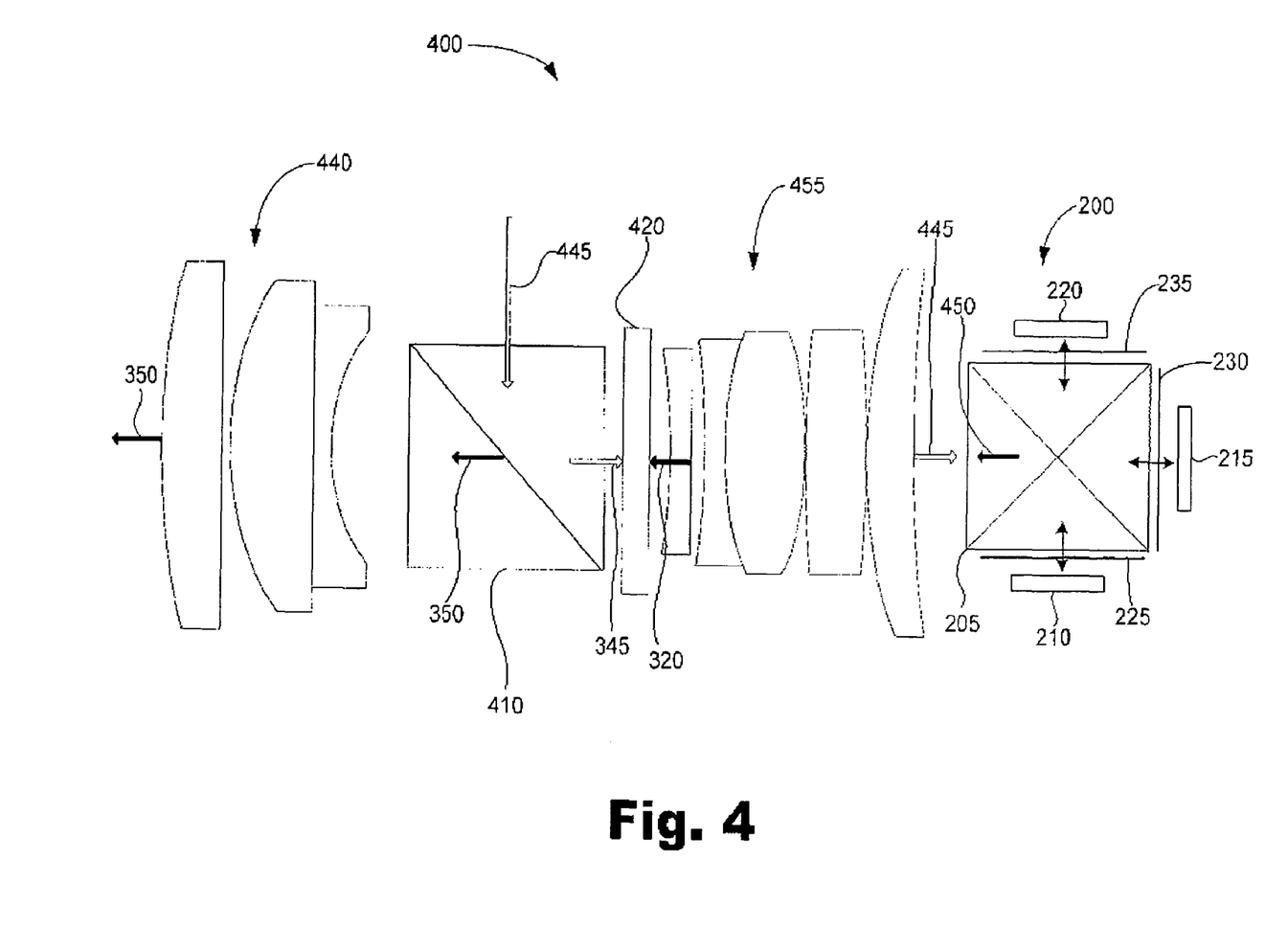
FIG. 4 illustrates an on-axis projection assembly according to one exemplary embodiment.

FIG. 4 illustrates an on-axis projection assembly (400). The projection assembly (400) includes a directing member such as a polarized beam splitter (PBS) (410), a ¼ wave plate (420), a light modulator panel assembly (200) including a dichroic beam splitter (205), a coupling lens assembly (455), and display optics (440). As will be discussed in more detail below, the on-axis projection assembly (400) uses polarization in an on-axis configuration to direct light to and from the light modulator assembly (200).

As seen in FIG. 4, multi-component polarized light, such as linearly polarized white light (445) is directed to the PBS (410). For ease of reference, polarized white light of an initial polarization and orientation will be described. Those of skill in the art will appreciate other configurations are possible. The PBS (410) is configured to the initially polarized and oriented white light directed thereto toward the light modulator panel assembly (200). As initially linearly polarized white light (445) is directed toward the light modulator assembly (200), it passes through the ¼ wave plate (420) and the coupling lens assembly (455). According to the present exemplary embodiment, the ¼ wave plate (420) changes the polarization of the white light to circular polarization and rotates the orientation 45 degrees.

After the polarized white light (445) is passed initially through the ¼ wave plate (420), the polarized white light (445) is directed to the coupling lens assembly (455). The coupling lens assembly (455) focuses the polarized white light (445) onto the light modulator assembly (200). The light modulator assembly (200) splits the polarized white light (445), passes each of the component beams through corresponding filters, and directs the component beams onto the red, green, and blue modulator panels (210, 215, 220). The red, green, and blue modulator panels (210, 215, 220) modulate the component beams to form modulated component beams.

The modulated component beams are then returned along substantially the same paths as taken to the modulator panels. This modulated light exits the light modulator assembly (200) and is directed to the coupling lens assembly (455). The coupling lens assembly (455) combines the output of each of the modulator panels (210, 215, 220) exiting the light modulator assembly (200) into a modulated light beam (450) and directs the modulated light beam (450) to the ¼ wave plate (420).

As the modulated light passes through the ¼ wave plate (420), the polarity of modulated light is again switched to linearly polarized light and the polarization is rotated another 45 degrees. As a result, the modulated light is orthogonally rotated relative to the initial orientation of the white light (445) entering the projection assembly (400). As previously discussed, the PBS (410) is configured to reflect light having the initial orientation. In addition, the PBS (410) is configured to transmit light of the orthogonal orientation. Accordingly, the PBS (410) passes the modulated light to the display optics assembly (440). The display optics assembly (440) directs the modulated light onto a display surface to form a full-color image thereon.

Off-Axis Projection Assembly

Figure 5:
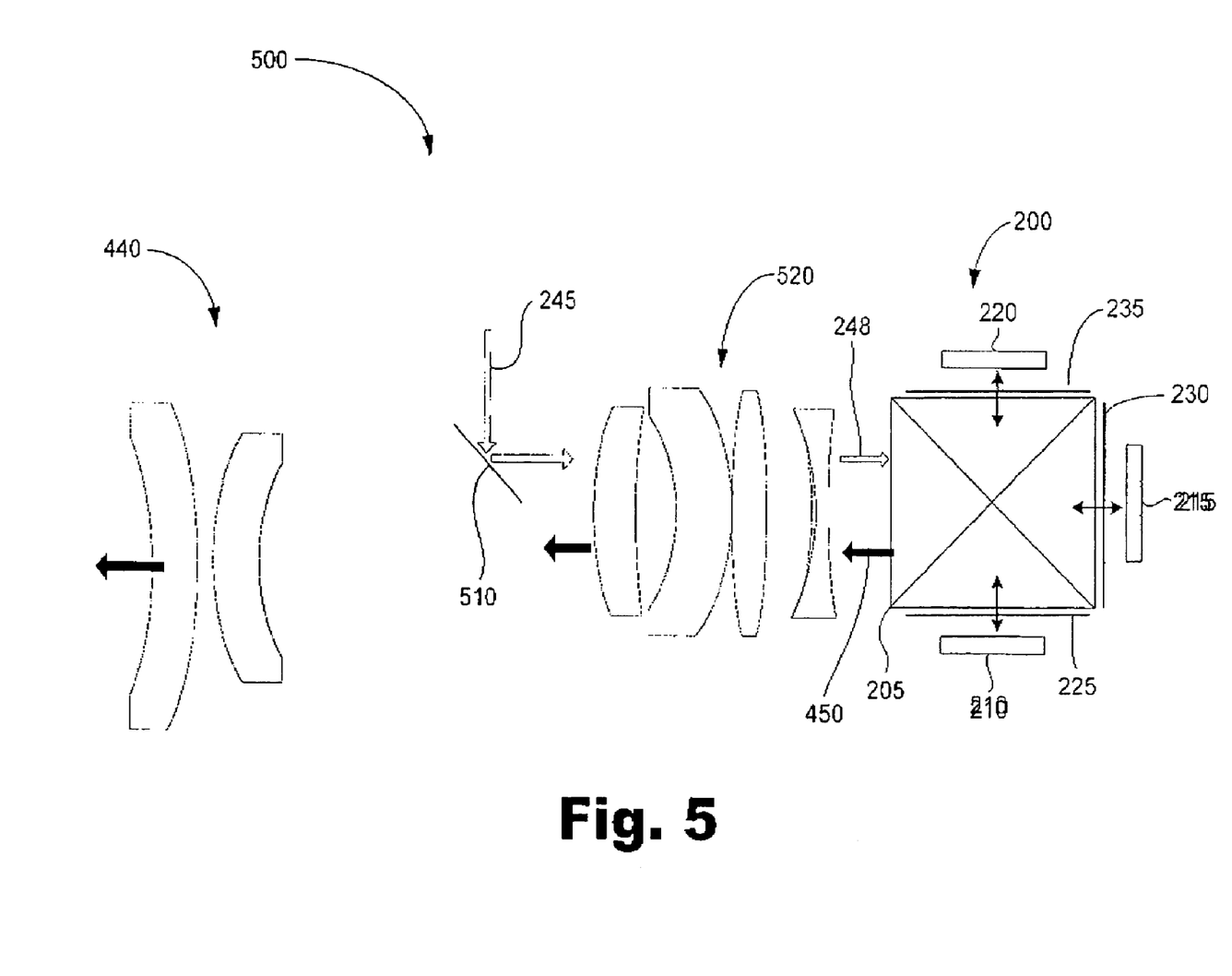
FIG. 5 illustrates an off-axis projection assembly according to one exemplary embodiment.

FIG. 5 illustrates an off-axis projection assembly (500). The projection assembly (500) includes a directing member such as a turning mirror (510), a coupling lens assembly (520), a light modulator assembly (200) including a dichroic beam splitter (205), and a display optics assembly (440). White light (248) from a light source module (12) is directed to the turning mirror (510).

The turning mirror (510) is located at the optical pupil of the projection assembly (500). This location of the turning mirror (510) may simultaneously minimize the size of the turning mirror (510) and the angle of the off-axis illumination. The turning mirror (510) directs the white light (248) to the coupling lens assembly (520).

The coupling lens assembly (520) focuses the illumination to the light modulator assembly (200). In particular, according to one exemplary embodiment shown in FIG. 5, the white light (248) is directed to the dichroic beam splitter (205) through a first or top portion of the coupling lens assembly (520). The dichroic beam splitter (205) splits the white light (248) into its color components and directs each color component to the blue, green, and red modulator panels (210, 215, 220) as previously discussed.

Each component color is modulated by the blue, green, and red modulator panels (210, 215, 220) to form individual sub-images or modulated components. These individual modulated components are then redirected from the blue, green, and red modulator panels (210, 215, 220) back through the dichroic beam splitter (205) and then to the coupling lens assembly (520).

In particular, according to the present exemplary embodiment, the modulated components travel through a second portion of the coupling lens assembly (520). As a result, the white light (248) and modulated component beams (350) are separated. The degree of separation is due, at least in part, to the off-axis angle, which may be approximately 10 degrees. The off-axis angle refers generally to angle between the path taken by the white light (248) and the modulated component beams (350).

As the modulated light travels through the coupling lens assembly (520), the modulated light is combined and then passed to the display optics assembly (440). The display optics assembly (440) then focuses the modulated light onto a viewing surface to form an image.

Method of Forming a Light Modulator Assembly

Figure 6:
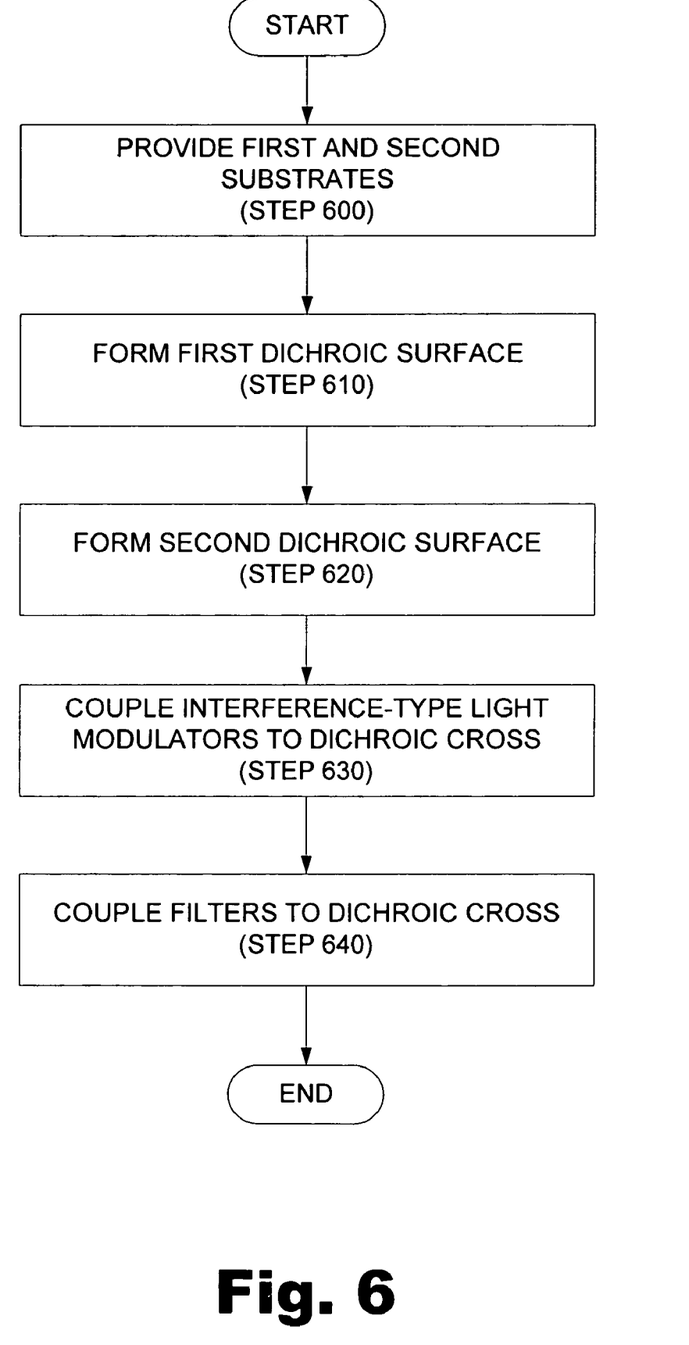
FIG. 6 is a flowchart illustrating a method of forming a light modulator assembly according to one exemplary embodiment.

FIG. 6 is a flowchart illustrating a method of forming a projection assembly. The method begins by providing a substrate for first and second dichroic surfaces (steps 600). Such substrates may include prisms or glass plates. A first dichroic surface is then formed on the first substrate (step 610). According to the present exemplary embodiment, the first dichroic surface is configured to transmit blue and green light and to reflect red light.

The next step is to form a second dichroic surface (step 620). According to the present exemplary embodiment, the second dichroic surface is configured to transmit red and green light and to reflect blue light. After the dichroic beam splitter has been formed (steps 600-620), corresponding light modulator panels are optically coupled to the dichroic beam splitter (step 630). The light modulator panels may be of any suitable type, including, interference type light modulator panels.

Corresponding filters are then be optically coupled thereto (step 640). The filters may include red, blue, and green filters placed between the dichroic beam splitter and the corresponding light modulator panel. The filters are configured to absorb undesired light directed to the corresponding light modulator panel.

The use of filters may reduce the dimensional tolerances associated with the surfaces of the dichroic beam splitter. In particular, undesired light that may be directed due to surface imperfections and/or dimensional tolerances may be absorbed by the optional filter such that only component light corresponding to each light modulator panel is incident on that modulator panel. The resulting light modulator assembly is configured to modulate multi-component light.

In conclusion a multi-panel light modulator assembly has been herein for use with projection assemblies and display systems such as televisions, projectors, etc. According to several exemplary embodiments, the multi-panel light modulator assembly includes a dichroic beam splitter that is configured to split multi-component light into several components. These component beams are passed through a corresponding filter as the component beams are directed to a corresponding light modulator panel. According to several exemplary embodiments, the light modulator panels are interference based light modulator panels. Each light modulator panel modulates the component light to form a sub-image. The sub-images are then directed back through the dichroic beam splitter and directed to display optics.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A projection assembly, comprising:
   a light source;
   a dichroic beam splitter having first and second crossed dichroic surfaces, wherein said beam splitter is optically coupled with said light source and divides light from said light source into differently colored light beams;
   at least one interference-type light modulator panel optically coupled to said dichroic beam splitter to receive one of said colored light beam from said dichroic beam splitter; and
   at least one filter at least partially between said light modulator panel and said dichroic beam splitter.

2. The assembly of claim 1, and further comprising first, second, and third interference type light modulator panels and first, second, and third filters placed between said dichroic beam splitter and said first, second, and third light modulator panels respectively.

3. The assembly of claim 2, wherein said first, second, and third light modulator panels include blue, green and red light modulator panels and said first, second, and third filters include blue, green and red filters.

4. The assembly of claim 1, wherein said dichroic beam splitter includes a dichroic cube.

5. The assembly of claim 1, wherein said first dichroic surface is configured to reflect red light and transmit blue and green light and said second dichroic surface is configured to reflect blue light and transmit red and green light.

6. The assembly of claim 1, further comprising
   a coupling lens assembly in optical communication with said dichroic beam splitter, said coupling lens assembly being configured to focus white light from said light source onto said dichroic beam splitter; and a directing member configured to direct light from said light source to said coupling optics.

7. The assembly of claim 6, wherein said directing member including a polarizing beam splitter.

8. The assembly of claim 6, wherein said directing member comprises a turning mirror.

9. The assembly of claim 8, wherein said coupling lens assembly and said turning mirror are configured to modulate light in an off-axis configuration.

10. The assembly of claim 6, and further comprising a display optics assembly.

11. The assembly of claim 1, further comprising:
    a polarizing beam splitter; and
    a quarter wave plate;
    wherein said polarizing beam splitter and quarter wave plate are optically coupled between said light source and said dichroic beam splitter.

12. The assembly of claim 1, further comprising a turning mirror for directed light from said light source to said dichroic beam splitter.

13. The assembly of claim 12, wherein said turning mirror directs said light off-axis through a coupling lens assembly to said dichroic beam splitter.

14. A projection assembly, comprising:
    a light source;
    a dichroic beam splitter having first and second crossed dichroic surfaces, wherein said beam splitter is optically coupled with said light source and divides light from said light source into differently colored light beams;
    at least one light modulator panel optically coupled to said dichroic beam splitter to receive one of said colored light beam from said dichroic beam splitter;
    at least one filter at least partially between said light modulator panel and said dichroic beam splitter; and
    a coupling lens assembly in optical communication with said dichroic beam splitter, said coupling lens assembly being configured to focus white light from said light source onto said dichroic beam splitter; and a directing member configured to direct light from said light source to said coupling optics;
    wherein said directing member including a polarizing beam splitter;
    wherein said coupling lens assembly, said dichroic beam splitter, and said polarizing beam splitter are configured to modulate light in an on-axis configuration.

15. The assembly of claim 14, further comprising:
    a quarter wave plate;
    wherein said polarizing beam splitter and quarter wave plate are optically coupled between said light source and dichroic beam splitter.

16. A display system, comprising:
    a light source module;
    a light modulator assembly including:
       a dichroic beam splitter including first and second dichroic surfaces, said dichroic surfaces being crossed relative to one another, wherein said beam splitter is optically coupled with said light source module and divides light from said light source module into differently colored light beams,
       at least one interference-type light modulator panel in optical communication with said dichroic beam splitter to receive one of said colored light beam from said dichroic beam splitter, and
       at least one filter placed at least partially between said dichroic beam splitter and said light modulator panel; and
    an image processing unit coupled to said light modulator assembly and being configured to control said light modulator assembly to modulate light from said light source module.

17. The system of claim 16, wherein said light modulator assembly includes a first, second, and third light modulator panels in optical communication with said dichroic beam splitter.

18. The system of claim 16, and further comprising a directing member and coupling optics, said directing member being configured to direct light from said light source module through said coupling optics to said light modulator assembly.

19. The system of claim 18, wherein said directing member includes a turning mirror.

20. The system of claim 18, wherein said directing member includes a polarized beam splitter and quarter wave plate.

21. A method of forming a projection assembly, comprising:
dividing light with a dichroic beam splitter into three differently colored light beams; and
placing first, second, and third interference type light modulator panels in optical communication with said dichroic beam splitter having crossed first and second dichroic surfaces, each modulator panel receiving a differently colored light beam from said beam splitter; and
placing first, second, and third color filters respectively between said dichroic beam splitter and said first, second, and third light modulator panels.

22. The method of claim 21, wherein placing said first, second, and third light modulator panels in optical communication with said dichroic beam splitter includes placing said first, second, and third interference type light modulator panels in optical communication with a dichroic cube.

23. The method of claim 21, wherein placing said first, second, and third light modulator panels in optical communication with said dichroic beam splitter includes placing said first, second, and third interference type light modulator panels in optical communication with a dichroic cross.

24. The method of claim 21, and further comprising coupling said dichroic beam splitter in optical communication with a coupling lens assembly and display optics.

* * * * *